United States Patent
Caillot et al.

(10) Patent No.: US 9,963,115 B2
(45) Date of Patent: *May 8, 2018

(54) WINDSCREEN WIPER CONNECTOR WITH INTERNAL ELECTRICAL CONTACT FORMING A SPRING

(71) Applicant: Valeo Systèmes d'Essuyage, Le Mesnil Saint Denis (FR)

(72) Inventors: Gérald Caillot, Cernay la Ville (FR); Vincent Izabel, Chilly Mazarin (FR); Jean-Michel Jarasson, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/429,627

(22) Filed: Feb. 10, 2017

(65) Prior Publication Data

US 2017/0151931 A1  Jun. 1, 2017

Related U.S. Application Data

(63) Continuation of application No. 13/805,431, filed as application No. PCT/EP2011/060472 on Jun. 22, 2011, now Pat. No. 9,598,053.

(30) Foreign Application Priority Data

Jun. 30, 2010  (FR) ..................... 10 02780

(51) Int. Cl.
| | |
|---|---|
| *B60S 1/40* | (2006.01) |
| *B60S 1/38* | (2006.01) |
| *B60S 1/52* | (2006.01) |
| *H01R 13/05* | (2006.01) |

(52) U.S. Cl.
CPC ............... *B60S 1/40* (2013.01); *B60S 1/3805* (2013.01); *B60S 1/524* (2013.01); *H01R 13/05* (2013.01); *B60S 1/52* (2013.01); *H01R 2201/26* (2013.01)

(58) Field of Classification Search
CPC ........ B60S 1/40; B60S 1/3805; B60S 1/3862; B60S 1/4038
See application file for complete search history.

*Primary Examiner* — Michael Jennings
(74) *Attorney, Agent, or Firm* — Osha Liang LLP

(57) ABSTRACT

Connector for retaining a wiper (3) on a windscreen wiper arm, including an internal electrical connection device between, on the one hand, an electrical connector connected to the electrical circuit of the vehicle and, on the other hand, at least one heating element (11) deposited on a reinforcement (20) implanted in said wiper, characterized in that said internal connecting device includes at least one metal part (10) extending perpendicularly to the heating element (11) and exerting pressure against it so as to ensure a permanent contact with said heating element (11).

11 Claims, 3 Drawing Sheets

WINDSCREEN WIPER CONNECTOR WITH INTERNAL ELECTRICAL CONTACT FORMING A SPRING

This application is a continuation application of U.S. patent application Ser. No. 13/805,431 filed Dec. 19, 2012, which is a national stage application of PCT/EP2011/060472 filed Jun. 22, 2011, which claims priority to FR 1002780 filed Jun. 30, 2010.

The field of the present invention is that of equipment for vehicles and more particularly that of equipments for wiping the windscreen of motor cars.

Motor cars are routinely equipped with wiping and washing systems for wiping and washing the windscreen and preventing distortion of the view that the driver has of their environment. These wiping systems comprise arms effecting an angular to-and-fro movement, at the end of which are installed elongate wipers themselves carrying squeegee blades produced in an elastic material. These blades rub against the windscreen and evacuate the water out of the field view of the driver. The wipers are produced in the form, either, in a classic version, of articulated brackets that hold the squeegee blade at a plurality of discrete locations, or, in a more recent, so-called "flat blade" version, a semi-rigid assembly that holds the squeegee blade over all its length. In both solutions the wiper is attached to the turning arm of the windscreen wiper by an assembly consisting of a mechanical connector and an adapter. The connector is a part that is fixed directly to the structure of the wiper or directly to the flat blade, the adapter being an intermediate part enabling fixing of the connector to the windscreen wiper arm. These two parts are connected to each other by a transverse shaft that allows relative rotation thereof.

Windscreen wipers are also equipped with devices for feeding a windscreen washing liquid that is fed from a tank situated on the vehicle and that is sprayed in the direction of the windscreen by nozzles generally situated on the bonnet or on the grille of the windscreen frame, or on the windscreen wiper itself for improved distribution of the liquid. In the case of nozzles placed on the wipers, the windscreen washing liquid is fed, before being distributed between them, by pipes that are fixed to the arm of the windscreen wiper and that are connected to the distribution system of the wiper at the level of the connector. The connector thus includes orifices adapted to receive the ends of said pipes by way of a watertight connection.

Also encountered in the motor vehicle after-sales service field are devices for heating the windscreen for de-icing the wiper in very cold weather and preventing ice from sticking it to the windscreen. These devices, which are more specifically suited to flat blade wipers, generally include a vertebra integrated into the whole of the squeegee blade and on which electrical heating elements are disposed. They also necessitate an electrical connection device, placed at the level of the connector, for transmitting to the vertebra the electrical current coming from the vehicle.

The vertebra is constituted of a rigid sole on which two metal tracks in which the electrical current flows are deposited to form a heating element. The connector must transmit the current, prevent short circuits and ensure a good contact with the heating elements.

An object of the present invention is to improve the situation by proposing feeding of the electrical current inside the connector as simply as possible for reasons of manufacturing simplicity and cost, whilst guaranteeing absence of short circuits and good contact with the heating elements, notably the heating resistances implanted on the vertebra, despite any loads linked either to the level of vibration or to imperfections of the road.

To this end, the invention consists in a retaining connector between a wiper and a windscreen wiper arm, including an internal electrical connection device between, on the one hand, an electrical connector connected to the electrical circuit of the vehicle and, on the other hand, at least one heating element implanted in said wiper. It is characterized in that said internal connecting device includes at least one metal part exerting pressure against said heating element so as to ensure a permanent contact with said heating element.

Thanks to this pressing against the heating element, the contact between the device internal to the connector and the heating element is ensured regardless of the loads, notably vibrations or impacts, suffered by the wiping system as a result of imperfections of the road on which the vehicle is moving.

Of course, the mechanical connection between the wiper and the windscreen wiper arm can be provided by means of an additional connecting part called an adapter.

Said metal part is perpendicular to said heating element.

In one embodiment, said metal part exerts its pressure via a conductive seal that also has a hydraulic sealing function between a hollow column in the connector and the exterior thereof, Thus a single part provides the electrical contact and the necessary isolation between the interior and the exterior of the connector.

Said metal part advantageously has a compression spring function.

In one particular embodiment said metal part is a tongue terminating at its lower end in a curved manner, for example in a crook shape curving upwards, i.e. toward a cover closing an orifice in the hollow column.

Said metal part is preferably force-fitted in the hollow column in said connector substantially perpendicularly to said heating element.

Said metal part more preferably includes asperities forming non-return devices of said metal part in said column.

Alternatively, the metal part is positioned in the cover that closes a connector, mechanical forces being taken up by the connection between the cover and the connector.

In another embodiment, said metal part is extended at its lower end by a foot or conductive seal extending in a direction inclined relative to the plane in which the heating element lies, said foot being provided with a contact lug extending in the plane of said heating element. In this case, the contact lug also has a compression spring function.

The invention also consists in a windscreen wiper comprising a reinforcement that extends lengthwise of the wiper and on which the heating element is deposited, the wiper being provided with a connector as described above.

The invention further consists in a vehicle windscreen wiper arm on which such a wiper is mounted.

The invention will be better understood, and other objects, details, features and advantages thereof will become more clearly apparent in the light of the following detailed explanatory description with reference to the appended diagrammatic drawings of a plurality of embodiments of the invention that are purely illustrative and not limiting on the invention.

Figure 1:
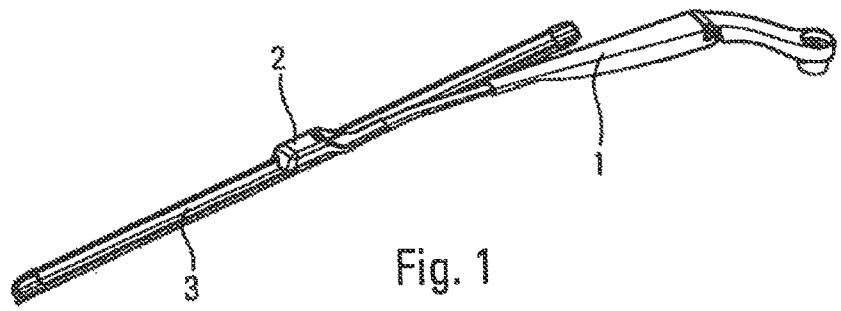
FIG. 1 is a general perspective view of a motor vehicle windscreen wiper.
Figure 2:
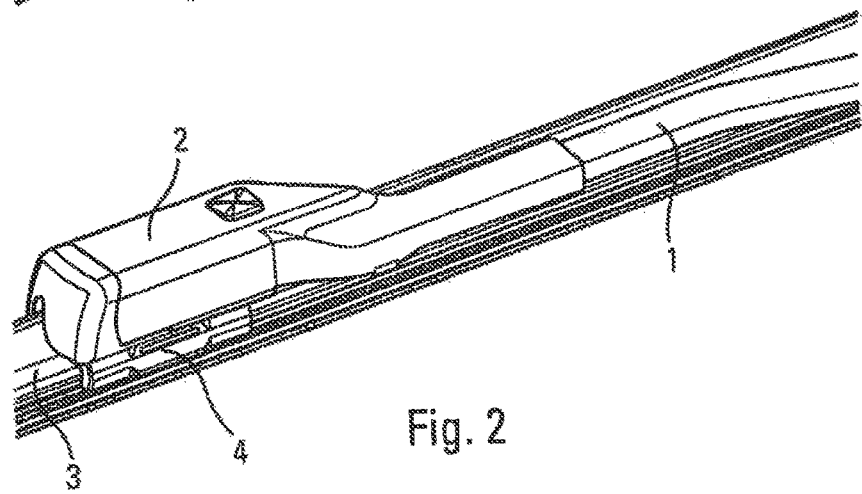
FIG. 2 shows a detail of FIG. 1.

Referring to FIGS. 1 and 2, there is seen a windscreen wiper classically composed of a wiper support or arm 1 terminating at its end in a yoke 2 that is crimped to the arm 1 and the function of which is, via an adapter, to support the wiper 3 carried by its connector 4. Alternatively, this yoke may equally be formed at the end of the arm by deformation thereof and with the arm constitute a unitary assembly.

The wiper 3 includes a metal reinforcement or vertebra that takes the form of a small blade integrated into the length of a squeegee portion of the wiper. This reinforcement supports heating elements, notably heating resistances, for heating the structure of the wiper and de-icing it in very cold weather, which enables the mechanical characteristics of the plastics constituting the wiper to be preserved.

Figure 3:
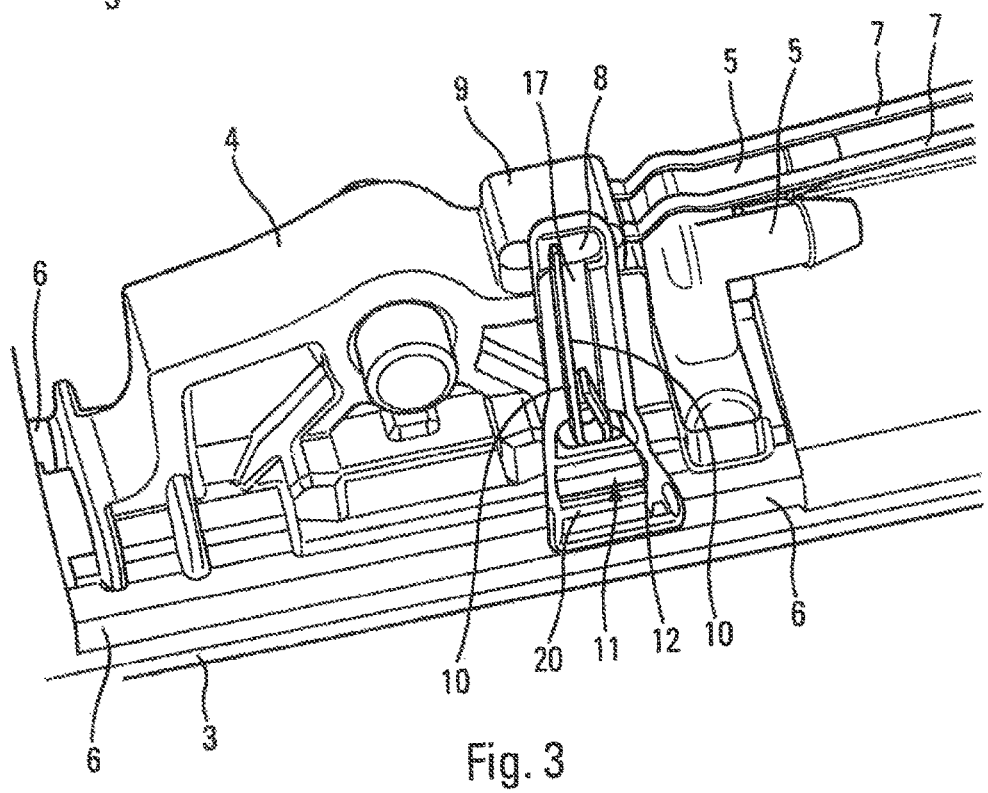
FIG. 3 is a perspective view of a windscreen wiper connector showing partly in section its internal electrical connection in a first embodiment.

Referring now to FIG. 3, there is seen a connector 4 mounted on a wiper 3. It includes two windscreen washing liquid feed tubes 5, which washing liquid passes through internal pipes of the connector 4 and is distributed to two distribution manifolds 6 to be sprayed onto the windscreen via nozzles positioned along all of the wiper 3. It also includes an electrical circuit for distribution of the current that is fed via two feed wires 7 carried by the arm 1. These wires 7 terminate in terminals 8 the function of which is to provide electrical contacts for electrical connection means internal to the connector 4 described hereinafter. These terminals 8 are positioned in a cover 9 that is carried by the connector 4 and that seals the live components from the outside, notably the surrounding water. Under the cover 9, inside the connector 4, there is seen a vertical hollow column 17, perpendicular to the heating element 11 or to the vertebra 20 inserted into the wiper 3, in which is positioned a metal part 10 providing the electrical connection between the electrical current feed wire 7 and a heating element 11 deposited on the vertebra 20. The metal parts 10 take the form of tongues but each of them includes, at its upper end, a slot in which one of the terminals 8 is inserted to provide a so-called fork type connection. Their lower end, on the other hand, is produced in the form of a crook 12, curving upwards i.e. toward the cover 9, which creates a spring contact against the heating elements 11. The connector thus comprises two hollow columns 17 inside which extends a metal part or tongue.

To retain them in the hollow column 17 of the connector 4 and to maintain a permanent bearing force against the heating element 11, the tongues 10 are provided with asperities, of the barb type, and are force-fitted into the connector. The barbs penetrate into the plastic material constituting the plastic body of the connector, which prevents the tongues 10 from being able to move in the reverse direction after their implantation and the contact between them and the heating elements from being broken. Alternatively, the tongues 10 are fixed or fastened against the bottom of the cover 9 in collaboration with the terminals 8. The permanence of a bearing force against the heating elements 11 is then guaranteed by the mechanical connection between the cover 9 and the body of the connector 4.

The cover 9 is assembled to the connector 4 by gluing, moulding or clipping and, in the latter case, a seal is added to make the seal between the cover 9 and the connector 4.

Figure 4:
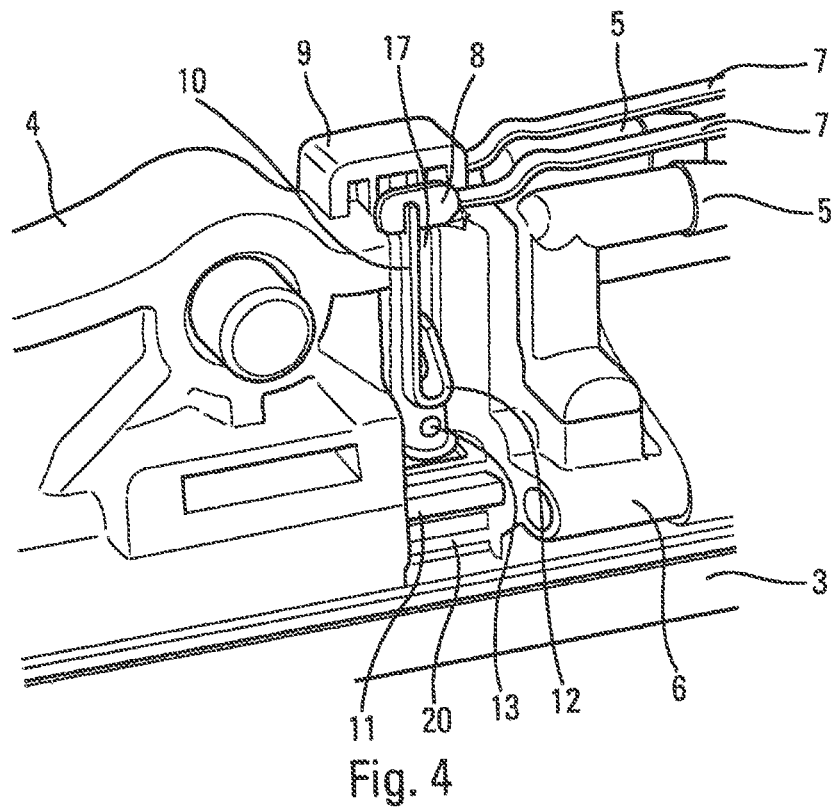
FIG. 4 is a perspective view of a windscreen wiper connector showing partly in section its internal electrical connection in a second embodiment.
Figure 5:
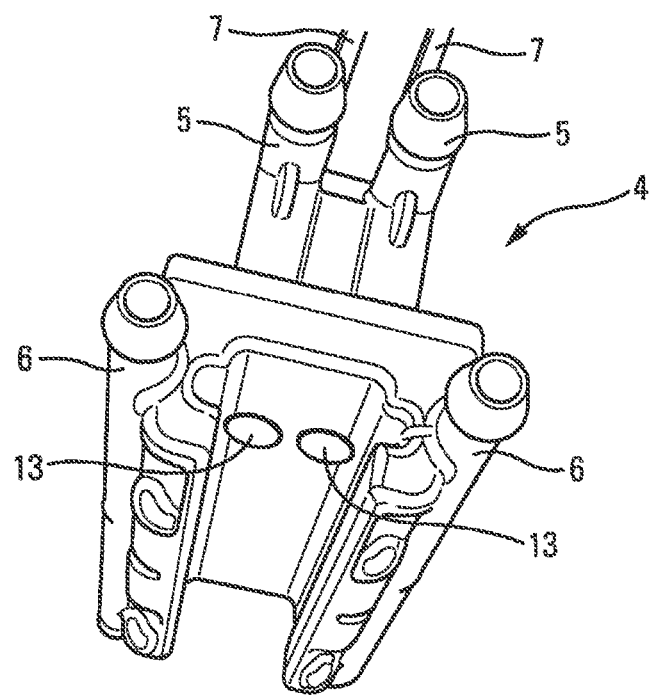
FIG. 5 is a perspective view from below of the connector from FIG. 5.

A second embodiment will now be described with reference to FIGS. 4 and 5. The elements of the connector identical to the first embodiment are designated by the same reference and are not described again. The second embodiment is distinguished from the first essentially in that the tongues 10 are shorter than in the first embodiment and consequently are not in direct contact with the heating elements 11 of the wiper 3. Contact is made via conductive seals 13 that contribute to the spring and damping function that the tongues 10 alone provide in the first embodiment. These conductive seals 13 also provide a watertight seal between the exterior of the connector and the interior thereof, at the level of the hollow columns 17.

These seals 13 are produced in an elastic material charged with metal particles to ensure their electrical conductivity whilst guaranteeing sufficient flexibility to provide their sealing function and a compression spring function. As can be seen in FIG. 5, they are positioned so as to pass through the lower base of the connector and to come into contact with the heating elements 11. The contribution of these seals 13 lies in the natural creation of a seal between the connector 4 and the wiper 3, which avoids the use of a resin to seal the assembly.

Figure 6:
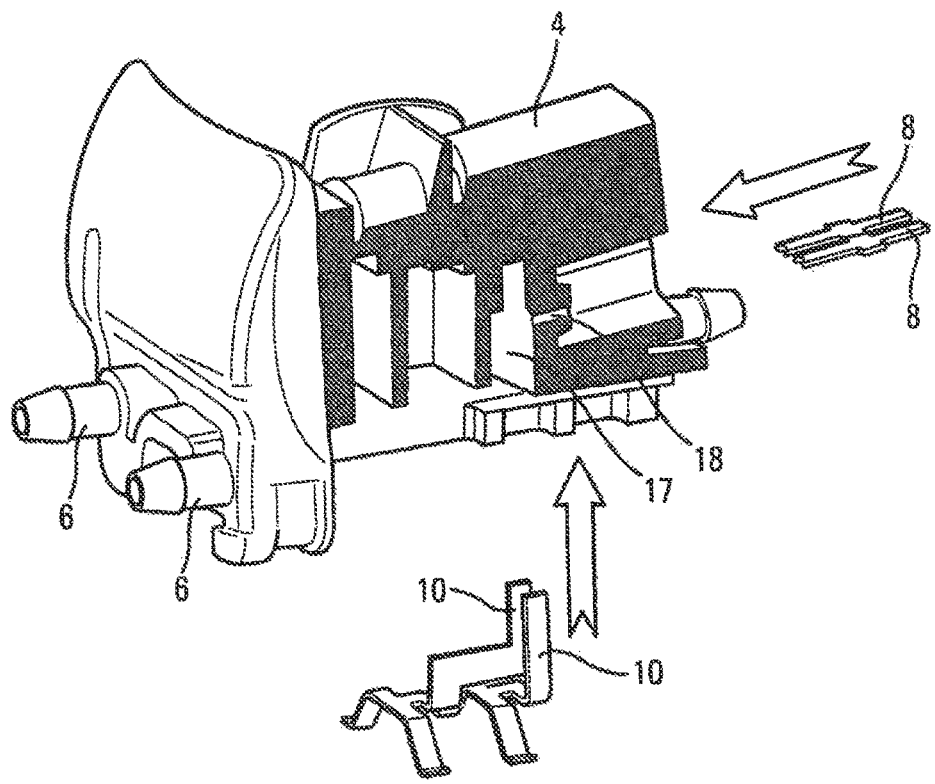
FIG. 6 is a perspective view in longitudinal section of a connector in a third embodiment.
Figure 7:
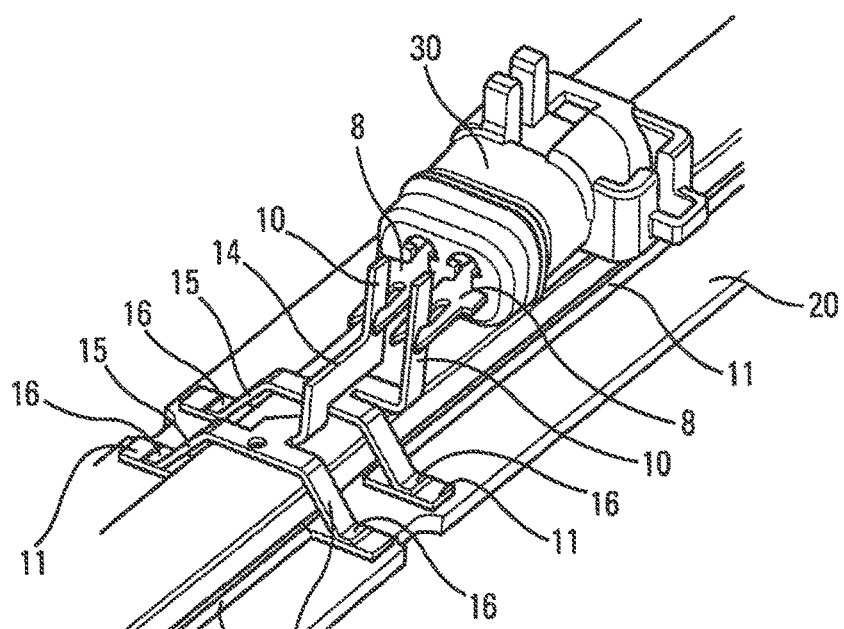
FIG. 7 is a perspective view of the internal electrical connection of the connector from FIG. 6.

FIGS. 6 and 7 show a third embodiment of the invention. In FIG. 6, the connector 4 is shown in section on a median longitudinal plane in order to make the internal cavities in which the metal connectors are implanted visible.

The terminals 8 that receive the electrical current coming from the vehicle via an electrical connector are inserted into a horizontal slot 18 while the tongues 10 are implanted in vertical hollow columns 17. The terminals 8 terminate at their end intended to cooperate with the tongue 10 in two teeth forming a fork attachment in which said tongues are inserted.

Referring more particularly to FIG. 7, there are seen the terminals 8 positioned in an electrical connector 30 in which they are retained and to which are connected the feeder wires (reference 7, FIG. 3) coming from the vehicle, more particularly coming from an electrical connector of the vehicle. In this third embodiment the tongues 10 are extended by a second tongue 14 that extends longitudinally and is divided into two feet 15. These two feet have a slope inclined relative to the horizontal, i.e. relative to the plane of the heating element 11 deposited on the vertebra or reinforcement 20 inserted in the wiper 3, which generates a spring effect if pressure is applied vertically to the first tongue 10. The feet 15 end in claws 16 that are in contact with the heating elements 11 deposited on the vertebra of the wiper.

The operation of the electrical connection inside the connector 4 of the first embodiment will now be described. The operation of this connection is exactly the same in the second and third embodiments.

The electrical current arrives at the level of the connector 4 via the feeder wires 7 that are connected to the vehicle via an electrical connector, of the type referenced 30 in FIG. 7. It enters the connector 4 at the level of its cover 9 that provides the seal between the bare metal contacts placed inside it and the outside environment, which may be drenched by water falling onto the windscreen wiper. The current passes from the feed wires 7 to the tongue 10 thanks to the terminal 8 and its contact with the slot positioned at the upper end thereof, and then into the heating elements 11 deposited on the vertebra 20 of the wiper 3, where it is converted to heat by the Joule effect, to heat the structure of the wiper and therefore combat icing up.

The pressure of the tongue 10 against the heating elements 11, which is obtained by the force fitting of the tongue and its barbed asperities or by the fixing of the tongue into the cover, guarantees contact of good quality between the two metal parts and a permanent contact despite the loads to which they are subjected as a result of vibration and jarring caused by the irregularities of the road.

In the second embodiment the pressurization is assured by the crushing of the conductive seals 13 by the shortened tongue 10, which is as previously force-fitted into the connector 4. As indicated above, this seal also provides a sealing function between the tongue 10 and the heating element 11 at the level of the passage through the lower base of the connector 4.

In the third embodiment, the pressurization is assured by the upper portion of the connector 4, which bears on the tongue 10 and causes relative separation of the two feet 15, pressing the lugs 16 against the heating elements 11.

The invention claimed is:

1. A windscreen wiper blade assembly comprising:
   a wiper that includes a wiping rubber with a wiper lip;
   at least one vertebra disposed on the wiper;
   a heating element disposed on the at least one vertebra;
   a retaining connector that connects the wiper to a wiper arm; and
   an internal electrical connection device disposed within the retaining connector,
   wherein the at least one vertebra and the heating element extends in a lengthwise direction of the wiper, and
   wherein the internal electrical connection device is positioned between an electrical connector connected to an electrical circuit of a vehicle and the heating element.

2. The windscreen wiper blade assembly according to claim 1, wherein the internal connecting device comprises at least one metal part exerting pressure against the heating element to ensure a permanent contact between the at least one metal part and the heating element.

3. The windscreen wiper blade assembly according to claim 2, wherein the at least one metal part is separable from the heating element.

4. The windscreen wiper blade assembly according to claim 2, wherein the metal part has a compression spring function.

5. The windscreen wiper blade assembly according to claim 2, wherein the at least one metal part is a tongue terminating at an end in a curved manner having a crook shape curving upwards.

6. The windscreen wiper blade assembly according to claim 2, wherein the at least one metal part is force-fitted in a hollow column in the connector perpendicular to the heating element.

7. The windscreen wiper blade assembly according to claim 6, wherein the at least one metal part includes asperities forming non-return devices of the at least one metal part in the column.

8. The windscreen wiper blade assembly according to claim 2, wherein the at least one metal part is extended at a lower end by a foot extending in a direction inclined relative to the plane in which the heating element lies, the foot is provided with a contact lug that extends in the plane of the heating element.

9. The windscreen wiper blade assembly according to claim 1, wherein the at least one vertebra is a small blade that is integrated into the length of a squeegee portion of the wiper.

10. The windscreen wiper blade assembly according to claim 1, wherein the retaining connector includes at least one liquid feed tube that receives a washing liquid and at least one distribution manifold that distributes the washing liquid to at least one liquid channel in the wiper.

11. The windscreen wiper blade assembly according to claim 10, wherein the wiper includes a plurality of nozzles that spray the washing liquid onto a surface of the windscreen of the vehicle.

* * * * *